United States Patent [19]
Nishiyama

[11] Patent Number: 5,495,599
[45] Date of Patent: Feb. 27, 1996

[54] INFORMATION PROCESSING SYSTEM FOR RELOCATING DATA AND CHANGING STATUS INFORMATION CORRESPONDING TO THE RELOCATED DATA

[75] Inventor: Masaki Nishiyama, Tokyo, Japan

[73] Assignee: Canon Kabushiki Kaisha, Tokyo, Japan

[21] Appl. No.: 291,047

[22] Filed: Aug. 15, 1994

Related U.S. Application Data

[63] Continuation of Ser. No. 950,775, Sep. 24, 1992, abandoned, which is a continuation of Ser. No. 300,747, Jan. 24, 1989, abandoned, which is a continuation of Ser. No. 68,724, Jul. 1, 1987, abandoned, which is a continuation of Ser. No. 616,704, Jun. 4, 1984, abandoned.

[30] Foreign Application Priority Data

Jun. 20, 1983 [JP] Japan .................................. 58-110355

[51] Int. Cl.$^6$ ............................. G06F 11/00; G06F 11/10
[52] U.S. Cl. .................. 395/185.09; 364/267.7; 364/260.2; 364/DIG. 1
[58] Field of Search .................................. 395/650, 700, 395/425, 575

[56] References Cited

U.S. PATENT DOCUMENTS

| | | | |
|---|---|---|---|
| 4,003,030 | 1/1977 | Takagi et al. | 364/900 |
| 4,122,359 | 10/1978 | Breikss | 307/64 |
| 4,131,942 | 12/1978 | Gillett et al. | 364/200 |
| 4,237,544 | 12/1980 | Bonyhard | 364/900 |
| 4,393,500 | 7/1983 | Imazeki et al. | 371/13 |
| 4,402,057 | 8/1983 | Itou et al. | 364/900 |
| 4,419,737 | 12/1983 | Yamaura | 364/900 |
| 4,447,887 | 5/1984 | Imazeki et al. | 364/900 |
| 4,601,009 | 7/1986 | Kogawa et al. | 364/900 |
| 4,611,282 | 9/1986 | McFiggans | 364/406 |
| 4,654,819 | 3/1987 | Stiffler et al. | 364/900 |

*Primary Examiner*—Kevin A. Kriess
*Assistant Examiner*—John Q. Chavis
*Attorney, Agent, or Firm*—Fitzpatrick, Cella, Harper & Scinto

[57] ABSTRACT

An information processing system that has a memory for storing information, a control memory for storing control information on the information stored in the memory, and a control unit for writing a signal representing "under writing", "under reading" or "under transfer" into the control memory while information is written into, read from or transferred from the memory.

4 Claims, 6 Drawing Sheets

| ID | TITLE | AD | BYTES |

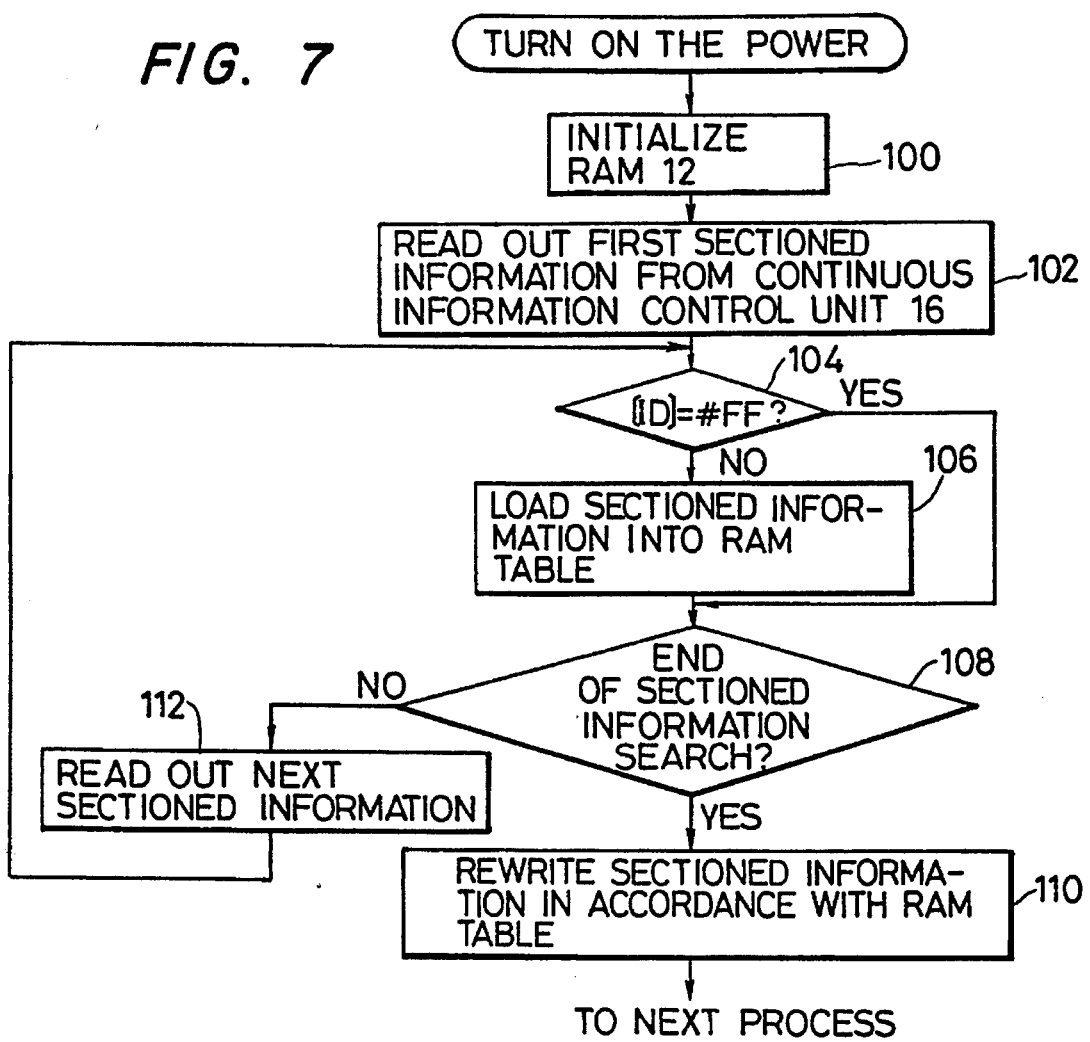

INFORMATION PROCESSING SYSTEM FOR RELOCATING DATA AND CHANGING STATUS INFORMATION CORRESPONDING TO THE RELOCATED DATA

This application is a continuation, of application Ser. No. 07/950,775, filed Sep. 24, 1992, now abandoned, which is a continuation of application Ser. No. 07/300,747 filed Jan. 24, 1989, now abandoned, which is a continuation of application Ser. No. 07/068,724, filed Jul. 1, 1987, now abandoned, which is a continuation of application Ser. No. 06/616,704, filed Jun. 4, 1984, now abandoned.

BACKGROUND OF THE INVENTION

1. Field of the Invention

The present invention relates to a memory control system, and more particularly to an information processing system such as an electronic typewriter having a memory.

2. Description of the Prior Art

With the development of the microprocessor, an electronic typewriter can readily attain a sentence registration function.

As a result, the a necessity of having to control a plurality of sentences has occurred. In the past, if the power fails or is momentarily turned off in the course of rearrangement of sentences in the memory for editing the sentences, all registered sentences are destroyed.

SUMMARY OF THE INVENTION

It is an object of the present invention to provide an information processing system which has protection means for a power-off of a memory unit for registering sentences and means for preventing registered sentences from being destroyed by a misoperation during the arrangement of the sentences.

It is other object of the present invention to provide an information processing system comprising:

memory means for storing information;

control memory means for storing control information on the information stored in the memory means; and control means for writing a signal representing the write operation into the control memory means while the information is written into the memory means, It is other object of the present invention to provide an information processing system comprising:

memory means for storing information;

control memory means for storing control information on said information stored in the memory means; and control means for writing a signal representing the transfer operation into the control memory means while the information in said memory means is read out for transfer.

It is other object of the present invention to provide an information processing system comprising:

memory means for storing different information;

control memory means for storing control information for each set of the different information; and control means for writing a signal representing the read operation into the control memory as one of the control information while one set of different information in the memory means is read out for transfer.

It is other object of the present invention to provide an information processing system comprising:

first memory means capable of storing a plurality of information signals, second memory means for storing control information for the plurality of information signals; and control means for writing a signal representing under the relocation operation into said second memory means as one of the control information while one of the plurality of information signals in the first memory means is relocated to other location in the first memory means.

BRIEF DESCRIPTION OF THE DRAWINGS

FIG. 7 is a flow chart of initialization procedures when power is turned on, and FIG. 8 shows a detail of a continuous information control unit and a RAM table when the power is turned on.

DETAILED DESCRIPTION OF THE PREFERRED EMBODIMENTS

Figure 1:
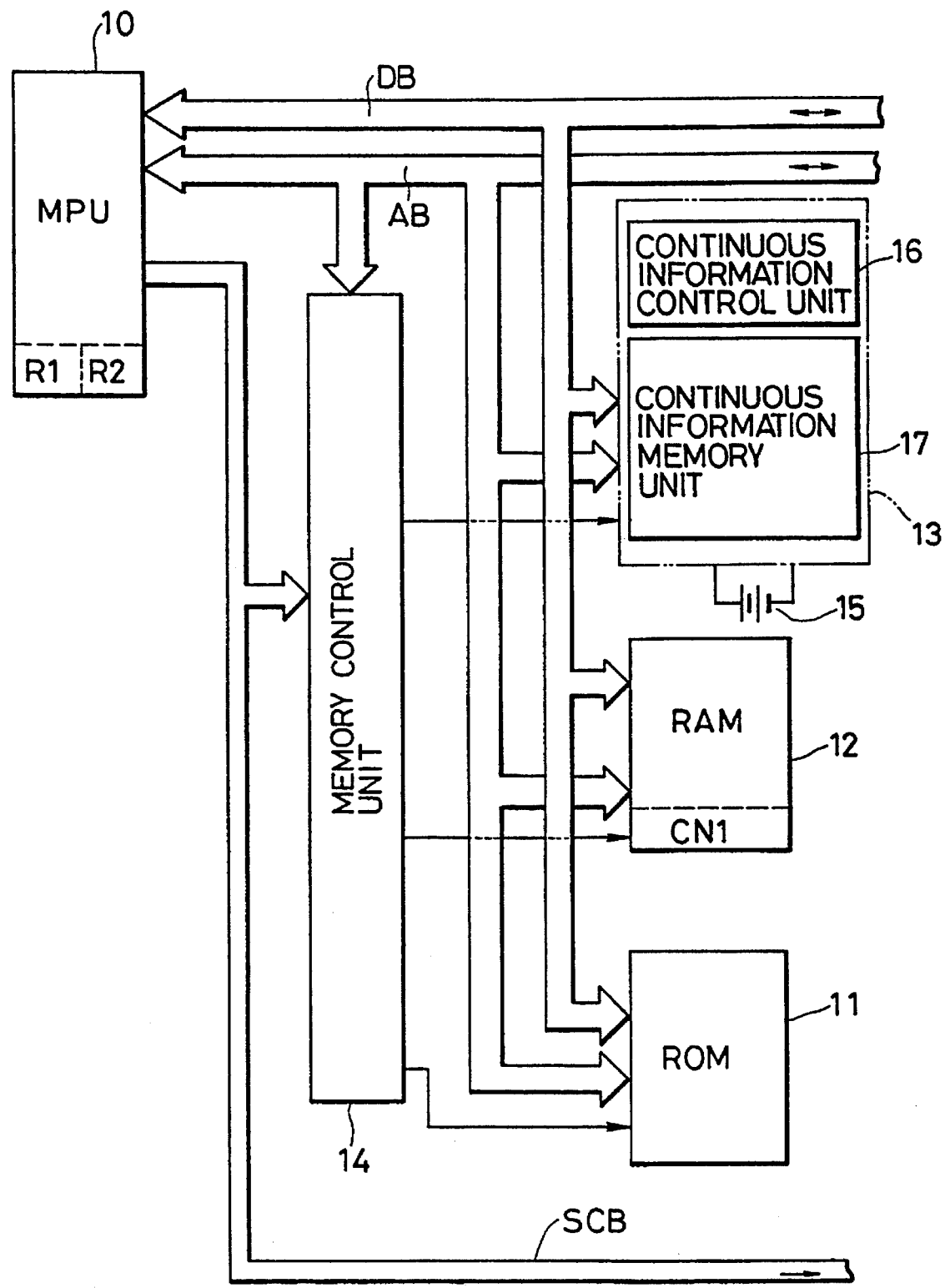
FIG. 1 is a system block diagram of one embodiment.

FIG. 1 is a block diagram of a memory control system of an information processing system in accordance with one embodiment of the present invention. Numeral 10 denotes a microprocessor (MPU) which controls the overall system. Numeral 11 denotes a read-only memory (ROM) which contains control procedures for controlling the system (for example, a program of FIG. 7 which will be explained later). Numeral 12 denotes a random access memory (RAM) which is used as a working memory of the MPU 10. Numeral 13 denotes a continuous information memory device which comprises a continuous information control unit 16 and a continuous information memory unit 17, which will be explained later. The continuous information memory device 13 includes a memory back-up battery 15 for protecting the memory content when the system power is turned off. Thus, it constitutes a non-volatile memory. Numeral 14 denotes a memory control unit which is connected to the MPU 10 through an address bus AB and a system control bus SCB. It generates select signals and read/write control signals during a read operation and during a write operation, respectively, of the ROM 11 and the RAM 12 to the continuous information memory device 13 and controls the respective memories.

The ROM 11, the RAM 12 and the continuous information memory device 13 are connected to the address bus AB and the data bus DB. When the data is to be read out in accordance with the control signal during a read operation and the select signal from the memory control unit 14, the memory content designated by the address bus AB is sent out to the data bus DB, and when the data is to be written, the content of the data bus is written into the address designated by the address bus AB.

While the respective memories are connected to the address bus AB in the illustrated embodiment, the address bus AB may be decoded by the memory control unit 14 and the address information may be sent out directly to the respective memories so that the respective memories are not connected directly to the address bus AB but are connected to the address bus AB through the memory control unit 14.

Figures 2, 3:
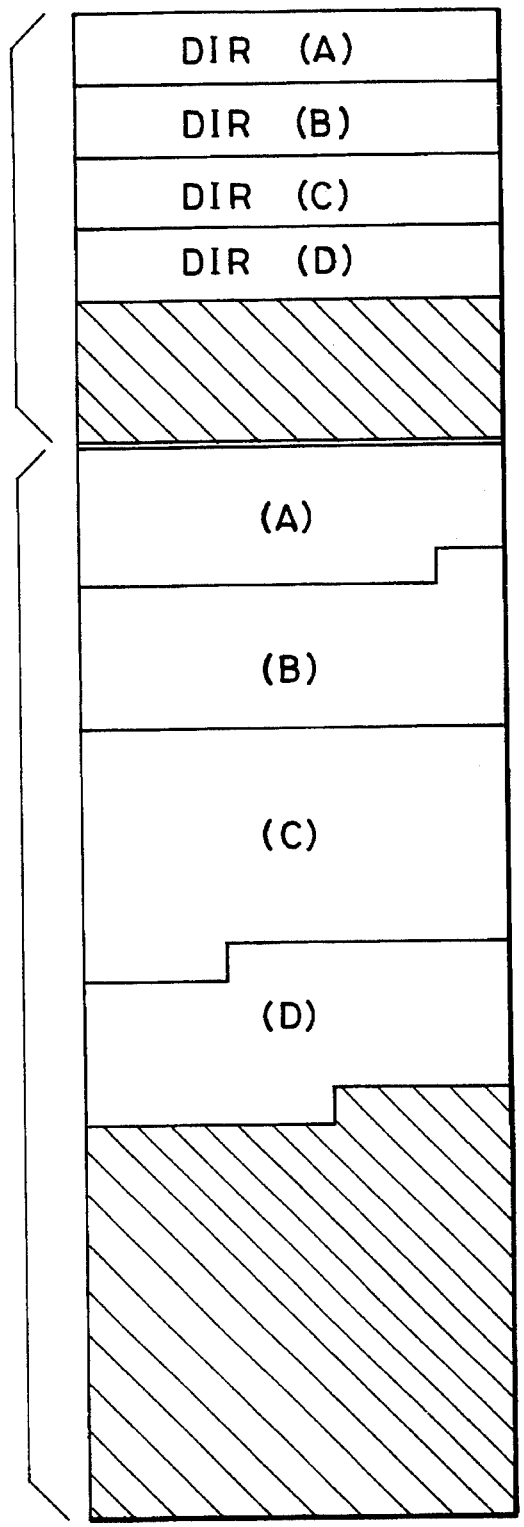
FIG. 2 shows the detail of a continuous information memory unit.
FIG. 3 shows the detail of sectioned information.

FIG. 2 shows a memory configuration in the continuous information memory device 13. The continuous information control unit 16 is the aggregation of sectioned information DIR (X) which correspond to the information groups (mainly sentence information) stored in the continuous information memory unit 17.

In the example of FIG. 2, four information groups A–D are included. A hatched area is a vacant area.

The DIR (A) corresponds to (A) in the continuous information memory unit 17, the DIR (B) corresponds to (B), the DIR (C) corresponds to (C) and the DIR (D) corresponds to (D).

A detail of the sectioned information DIR (X) of the continuous information control unit is shown in FIG. 3. A field ID consists of one byte (eight bits) and is a flag for indicating the validity of the information group specified by this sectioned information. A field TITLE is a title inherent to the corresponding continuous information in the continuous information memory unit 17. It has an eight-byte capacity and contains character codes (for example, ASCII code). A field AD is a start address of the continuous information in the continuous information memory unit 17, and a field BYTES indicates a length (capacity) of the corresponding continuous information. Both fields are two bytes in length.

An example of changing the content of the continuous information (B) of FIG. 2 is now explained with reference to a control flow chart of FIG. 6 and FIGS. 4 and 5.

Prior to changing the content of the continuous information (B), the continuous information (C) and (D) stored adjacent to (B) are relocated outside of the continuous information memory unit 17 (the endmost area in the illustrated embodiment), and then the content of the continuous information (B) is changed.

Figure 4C:
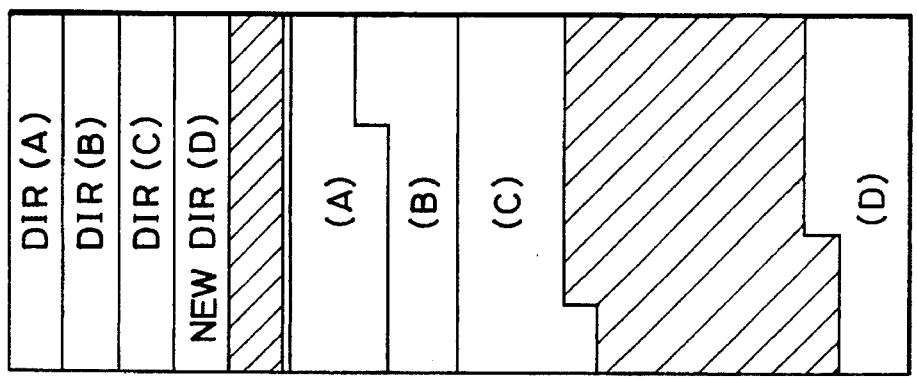
FIGS. 4A–4C and 5A–5C illustrate transition charts in the continuous information memory unit during relocation of continuous information.
Figure 4B:
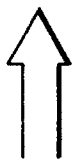
Figure 4B:
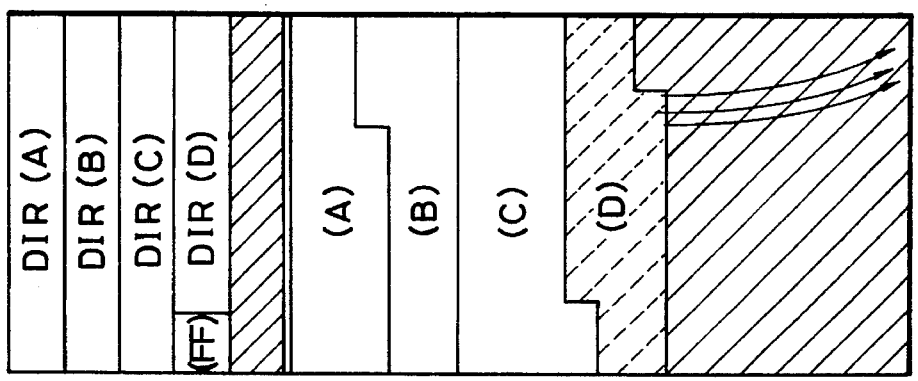
Figure 5C:
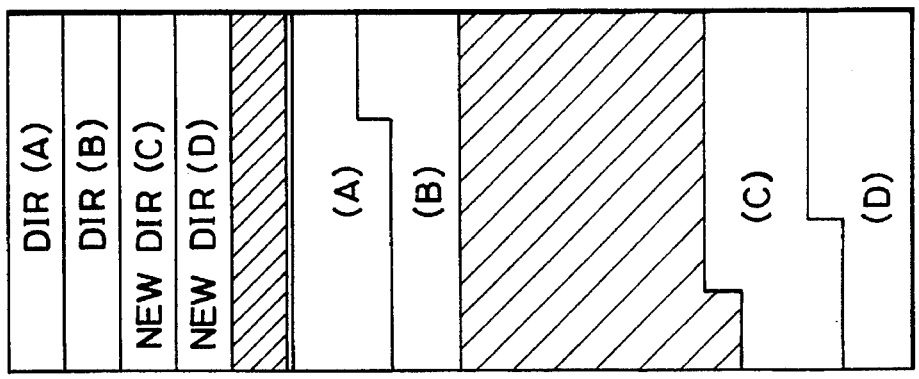
Figure 5B:
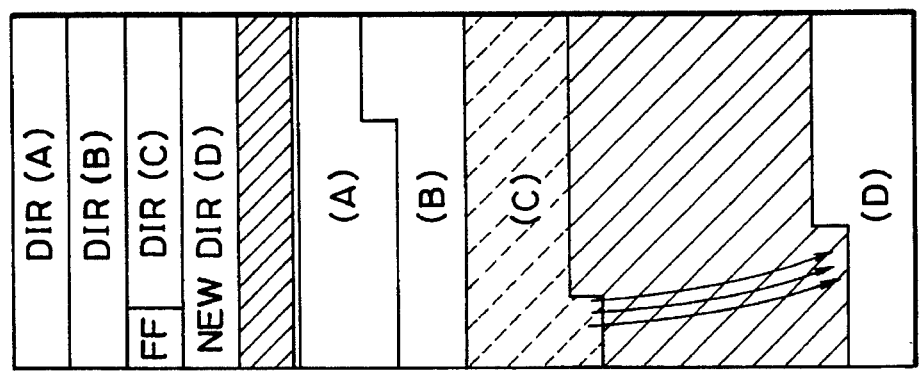
Figure 5A:
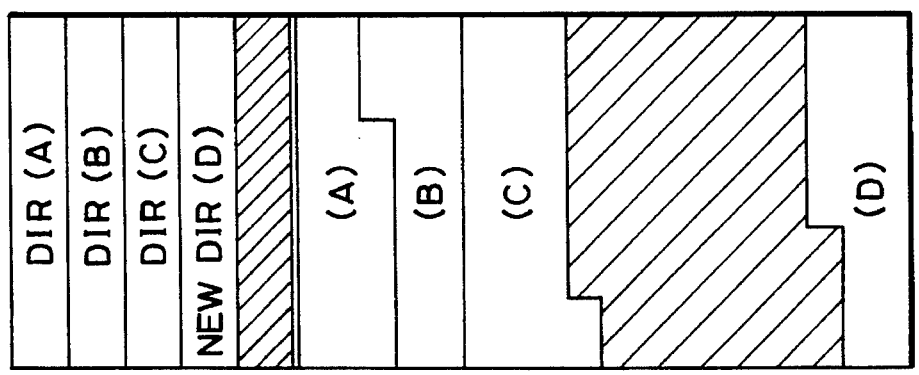
Figure 6:
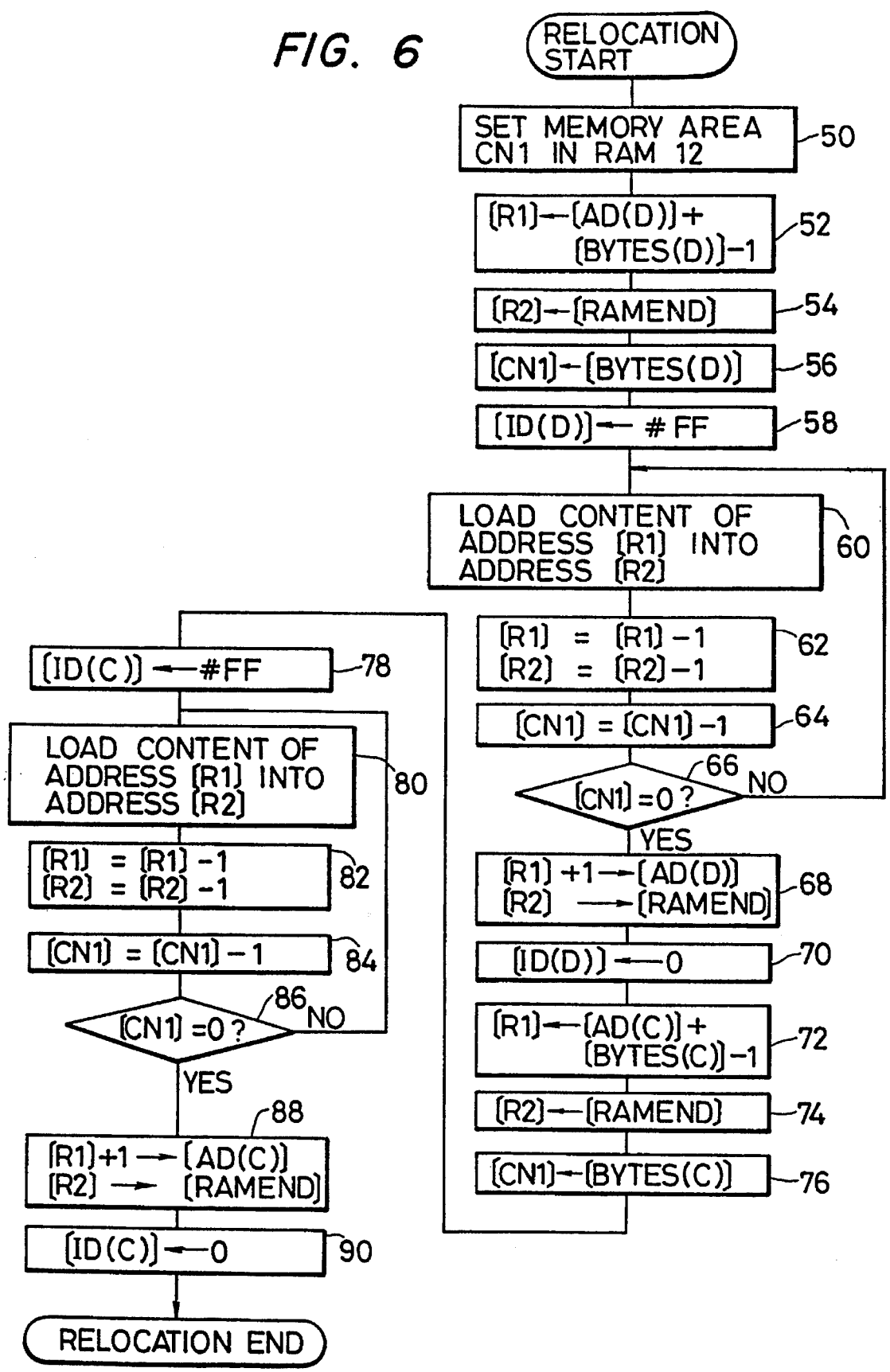
FIG. 6 is a flow chart of a control in the continuous information relocation.

The control flow chart for the relocation is shown in FIG. 6, and the transition charts for the storage status of the continuous memory unit 13 are shown in FIGS. 4 and 5.

Figure 4A:
Figure 4A:
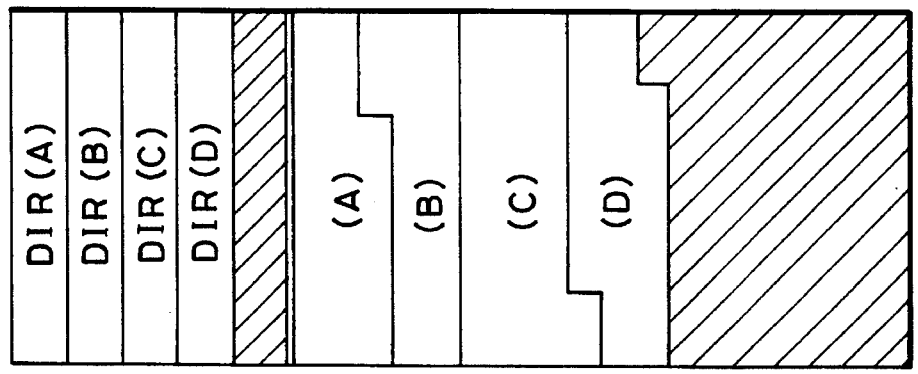

Let us assume that the continuous information (D) of the continuous information (A)–(D) in FIG. 4A is to be relocated during a relocation or transfer operation.

In step 50 of FIG. 6, a memory area CN1 is set in the RAM 12. It is used as a continuous information transfer counter.

In step 52, the MPU 10 calculates the end address {AD (D)+ BYTES (D)–1} of the continuous information (D) based on the start address AD (D) and the length BYTES (D) of the continuous information (D) of the sectioned information DIR (D) in the continuous information control unit 16 corresponding to the continuous information (D) in the continuous information memory unit 17, and stores it in a register R1 in the MPU 10. In step 54, the end address (RAMEND) of the unused area (vacant area) of the continuous information memory unit 17 is stored in a register R2 in the MPU 10. In step 56, the length of BYTES (D) is stored in the CN1. In step 58, information (#FF) representing that the continuous information (D) is being relocated (read or written) is stored in the ID (D)of the sectioned information DIR (D). In step 60, the content at the address designated by the content of the register R1, that is, the end address of the continuous information (D) is stored at the address designated by the content of the register R2, that is, the unused area (destination area) of the continuous information memory unit 17. In step 62, the registers R1 and R2 are decremented, and in step 64, the CN1 is decremented to prepare for the transfer of the content at the next address. In step 66, the content of the CN1 is checked and if it is not "0" the program returns to step 60 to transfer the content at the next address. The confirmation of the continuous information memory unit 13 for this operation is shown in FIG. 4B.

In step 66, if {CN1} is "0" indicating that all of the continuous information (D) has been transferred, {(the content of the register R1)+1} at the end of the transfer, the start address of the relocated continuous information is transferred to the AD of the sectioned information DIR (D) and the content of the register R2, the end address of the unused area of the continuous information memory unit 17, is transferred to the RAMEND in step 68, and in step 70, the information of the ID of the sectioned information DIR (D) is set to "0" to store the end of relocation. The configuration of the continuous information memory unit 13 at the end of the relocation is shown in FIG. 4C.

After the end of the relocation of the continuous information (D), the continuous information (C) is relocated. The control flow chart for the relocation of the continuous information (C) is shown by steps 72–90 in FIG. 6. It is similar to the processing of the steps 52–70, and the continuous information (C) designated by the DIR (C) is relocated based on the sectioned information DIR (C). The configuration before the relocation of the continuous information (C) of the continuous information memory unit 13, shown in FIG. 5A, is relocated to the confirmation shown in FIG. 5B (The ID (C) of the DIR (C) is #FF.) after the relocation, the construction is shown in FIG. 5C. The control for this relocation is apparent from the relocation control of the continuous information (D) and the flew chart of FIG. 6.

In this manner, during the relocation of the continuous information, the ID of the sectioned information is set to the specified state (#FF in this example). The memory content of the continuous information memory unit 13 is protected by the back-up battery 15 even if power failure occurs is lost power momentarily during the relocation and the transfer is interrupted or the content of the RAM 12 is destroyed and the MPU 10 is started from the initial state or the system is reset. Or, since the ID in the sectioned information for the continuous information being relocated is set to #FF, the continuous information being relocated is invalidated by the #FF to prevent the error or the malfunction even if the content of the continuous information being relocated is destroyed when the system processing is interrupted.

In the above embodiment, the ID is set to #FF when the continuous information is relocated. When the continuous information is no longer necessary, the ID may also set to #FF to invalidate the continuous information designated by the sectioned information.

A control flow chart for system start-up when the power is turned on is shown in FIG. 7.

When the power is turned on, the RAM 12 is initialized by the control of the MPU 10 in step 100, and in step 102, the first sectioned information in the continuous information control unit 16 is read out.

As an example, the state of FIG. 5B in which the power is turned off during the relocation of the continuous information (C) is explained.

First, the sectioned information DIR (A) is read out in accordance with FIG. 5B. In step 104, the ID of the sectioned information just read is checked, and if it is not #FF, the sectioned information is written into a sectioned information table in the RAM 12 (step 106). If the ID is #FF in step 104, the sectioned information is not written into the table. In step 108, whether all sectioned information has been searched is checked, and if not, the next sectioned information is read out at step 112. In accordance with FIG. 5B, the DIR (B) is read out next. After step 112, steps 104 to 108 are reexecuted. When the DIR (C) of FIG. 5B is read out, the ID is #FF and step 106 is not executed, that is, the sectioned information is not written into the table. The DIR (D) of FIG. 5B is read out and the sectioned information is written into the table. In step 108, the end of the sectioned information search is detected and the program proceeds to step 110. In step 110, the table in the RAM 12 is updated by the content of the information control unit 16 and the DIR (C) whose ID is #FF is erased from the control unit 16 and the continuous information (C) is invalidated. The table in the RAM 12 and the sectioned information in the continuous information control unit 16 are shown in FIG. 8. As shown in FIG. 8, the DIR (C) of the sectioned information is completely erased. The processing is thus terminated.

As described hereinabove, according to the present invention, even if power failure occurs or power is turned off by accident during the transfer of the information in the continuous information memory unit, only the information being transferred is invalidated and all other information is not destroyed and can be protected. Accordingly, other information is not destroyed by the misprocessing of the information being transferred when the power is again turned on.

What I claim is:

1. An information storage system comprising:

first non-volatile memory means for storing a plurality of sets of information;

second non-volatile memory means, connected to said first non-volatile memory means, for storing a plurality of control information corresponding to the plurality of sets of information, respectively, the plurality of control information including respective status information and respective location information, wherein said first and second non-volatile memory means preserve stored information if an interruption in power supplied to the system occurs;

work area preparing means, connected to said first non-volatile memory means, for preparing a work area succeeding a desired set of information to update the desired set of information by relocating a plurality of set of information succeeding the desired set of information to an area separate from an area of the desired set of information in said first non-volatile memory means, the relocating being performed by transferring the plurality of sets of information sequentially, one-by-one; and control means, connected to said second non-volatile memory means and said work area preparing means, for changing the status information corresponding to the one of the plurality of sets of information to be transferred, to indicate that the corresponding set of information is being transferred at the beginning of transfer, and for restoring the status information and updating the location information at the end of transfer, wherein said control means includes means for invalidating a set of information being transferred when the interruption of power supplied to the system occurs deleting control information including the status information indicating that the corresponding set of information is being transferred from said second non-volatile memory means when the system is started after the interruption of power supplied to the system.

2. An information storage system according to claim 1, wherein said first non-volatile memory means and said second non-volatile memory means are formed on the same memory medium.

3. An information storage system according to claim 1, wherein said first non-volatile memory means and said second non-volatile memory means include back-up batteries.

4. An information storage system according to claim 1, wherein said control means comprises:

read out means for reading out the plurality of control information from said second non-volatile memory means except for the control information including the status information indicating the set of information is being transferred;

third memory means for storing the plurality of control information read out from said second non-volatile memory means temporarily; and means for replacing the contents of said second non-volatile memory means with the contents of said third memory means.

* * * * *

UNITED STATES PATENT AND TRADEMARK OFFICE
CERTIFICATE OF CORRECTION

PATENT NO. : 5,495,599                    Page 1 of 2
DATED      : February 27, 1996
INVENTOR(S): Masaki NISHIYAMA It is certified that error appears in the above-indentified patent and that said Letters Patent is hereby corrected as shown below:

COLUMN 1:

Line 24, "a" (first occurrence) should be deleted.
Line 38, "other" should read --another--.
Line 46, "other" should read --another--.
Line 56, "other" should read --another--.
Line 66, "other" should read --another--.

COLUMN 2:

Line 5, "under" should be deleted.

COLUMN 4:

Line 27, "confirmation" should read --configuration--.
Line 31, "flew" should read --flow--.
Line 36, "is lost" should read --or--.
Line 37, "power" should read --power is lost--.

UNITED STATES PATENT AND TRADEMARK OFFICE
CERTIFICATE OF CORRECTION

PATENT NO. : 5,495,599
DATED : February 27, 1996
INVENTOR(S) : Masaki Nishiyama

It is certified that error appears in the above-indentified patent and that said Letters Patent is hereby corrected as shown below:

COLUMN 5:

Line 44, "set" (first occurrence) should read --sets--.

COLUMN 6:

Line 16, "occurs" should read --occurs by--.

Signed and Sealed this

Thirteenth Day of August, 1996

Attest:

BRUCE LEHMAN

Attesting Officer     Commissioner of Patents and Trademarks